C. H. VAN NOSTRAND AND H. E. SCHULSE.
FIBROUS FILTERING FILM.
APPLICATION FILED MAY 28, 1918.

1,389,401.

Patented Aug. 30, 1921.

INVENTOR
Charles H. Van Nostrand,
Herman E. Schulse,
BY
Kenyon & Kenyon,
their ATTORNEYS

UNITED STATES PATENT OFFICE.

CHARLES H. VAN NOSTRAND, OF ORANGE, AND HERMAN E. SCHULSE, OF JERSEY CITY, NEW JERSEY; SAID SCHULSE ASSIGNOR TO SAID VAN NOSTRAND.

FIBROUS FILTERING-FILM.

1,389,401.　　　　　　　Specification of Letters Patent.　　Patented Aug. 30, 1921.

Application filed May 28, 1918. Serial No. 236,995.

*To all whom it may concern:*

Be it known that we, CHARLES H. VAN NOSTRAND and HERMAN E. SCHULSE, citizens of the United States, the former a resident of Orange, Essex county, State of New Jersey, and the latter a resident of Jersey City, Hudson county, State of New Jersey, have invented certain new and useful Improvements in Fibrous Filtering-Films, of which the following is a specification.

Our invention relates to filtering films made of fibrous filtering material. It has for its object to produce new and improved filtering films made of fibrous material, light in construction and suitable in shape to be removable and replaceable in connection with suitable supporting devices, and presenting a minimum of joints and clamping means at such joints, and giving relatively large and efficient filtering surface, and possessing other advantages herein recited.

It consists of the new and improved filtering films herein shown and described.

Figure 1:
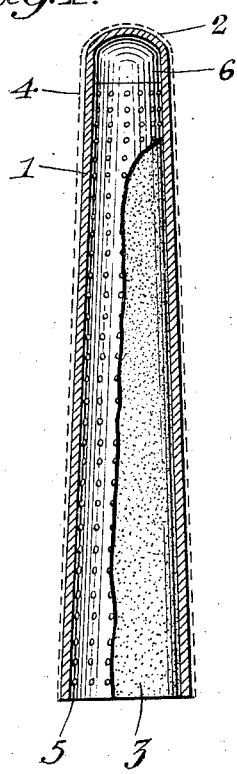
Figure 2:
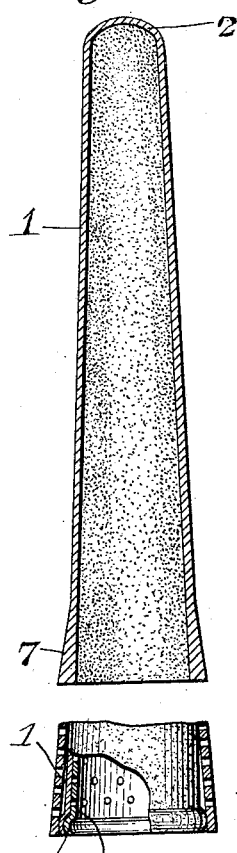
Figure 3:
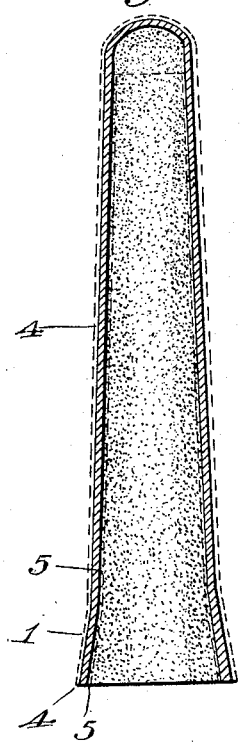
Figure 4:
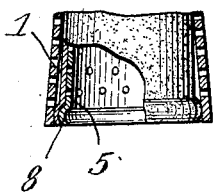

In the drawings accompanying the specification we show our improvement in its preferred form. Referring to such drawings, Figures 1, 2 and 3 are longitudinal sections through our improved filtering film, Fig. 1 being also through the inner and outer perforated plates, Fig. 2 showing the film slightly thickened at its base, and Fig. 3 showing the film slightly thickened at its base, and Fig. 3 showing the supporting perforated plates as inclined slightly outward at their bases. Fig. 4 shows a modified form of the base of the supporting plates.

Our improved film is made tapering in form, preferably closed at the apex and open at the base, and is made of any light fibrous filtering material, such as sheet asbestos, preferably of substantially the same thickness, texture and density throughout. It may be made by means of any suitable apparatus and any suitable process, as, for instance, by the apparatus and process shown in our pending applications No. 216,110 and No. 216,111, of which latter case this application is a division. In practice we prefer to make it from asbestos which has been treated so as to make a sheet of compressed asbestos of the same thickness, texture and density throughout the sheet. It is then made into the desired form in any suitable way.

In the drawings 1 represents the finished film. As shown it is slightly tapering with a rounded and closed apex 2, and having only one opening, namely, at the base 3. The films are easily and cheaply transportable, nesting in one another, either so that many can be packed into a small space or even, in certain instances, the films can be flattened out for purposes of packing and transportation without substantial injury to their subsequent operation when restored to conical form.

Our improved films are particularly serviceable for use in connection with perforated inner and outer supports of substantially the same shape. 4 illustrates an outer perforated support and 5 an inner perforated support. The latter is preferably provided with an imperforate rounded apex 6. Our improved film is nested between an inner and outer perforated support. At the apex there is no joint due to the imperforate cap or apex of the inner support, so that only one joint remains to be clamped, namely, at the base or opening of the filtering supports and film. The slightly tapering shape of the film and its supports enables a tight joint to be made at this point between them by merely slipping one over the other.

The film shown in Fig. 2 is thickened at its base as shown at 7. This assists in tightening the joint at the base between the film and its supports. In Fig. 3 the supports 4 and 5 are shown as slightly inclined outward. This is to further assist in tightening the joint. In Fig. 4 the inner perforated support 5 is shown as provided with a bead as shown at 8. The film is compressed between the head and the outer support.

It will be understood of course that many changes or modifications may be made without departing from our invention, the essentials of which are set forth in the appended claims.

What we claim as new and desire to secure by Letters Patent is:

1. As an article of manufacture, a filtering film section composed of a filtering film tapering in form, made of fibrous filtering material compressed so as to be of even porosity throughout, and an outer and inner perforated support of the same tapering form, the film and its two supports adapted to nest upon one another to form a tight joint at the base.

2. As an article of manufacture, a filtering film section composed of a filtering film tapering in form, made of fibrous filtering material compressed so as to be of even porosity throughout, and with a closed apex and open base, and an outer and an inner perforated support similarly tapering in form, and each solid at its apex and open at its base, the film being adapted to be nested between the two supports, and the film and its supports when thus nested and forced togther adapted to form a tight joint at their base, 3. As an article of manufacture, a filtering section composed of a filtering firm, tapering in form, closed at its apex and open at its base, and made of fibrous filtering material compressed so as to be of the same porosity throughout, and an outer and inner perforated support similarly tapering and closed at their apexes and open at their bases and flaring slightly outward at their bases, the film being adapted to nest between the supports and the three, when nested and pressed together adapted to form a tight joint at the base.

In testimony whereof, we have signed our names to this specification.

CHARLES H. VAN NOSTRAND.
HERMAN E. SCHULSE.